(12) United States Patent (10) Patent No.: US 8,472,299 B2
Hayashi et al. (45) Date of Patent: Jun. 25, 2013

(54) OPTICAL ELEMENT AND OPTICAL PICKUP DEVICE USING THE SAME

(75) Inventors: Katsuhiko Hayashi, Nara (JP);
Yasuhiro Tanaka, Hyogo (JP);
Michihiro Yamagata, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 13/411,636

(22) Filed: Mar. 5, 2012

(65) Prior Publication Data

US 2012/0163154 A1 Jun. 28, 2012

Related U.S. Application Data

(63) Continuation of application No. PCT/JP2010/005688, filed on Sep. 17, 2010.

(30) Foreign Application Priority Data

Sep. 17, 2009 (JP) ................................ 2009-216224

(51) Int. Cl.
*G11B 7/00* (2006.01)

(52) U.S. Cl.
USPC ............. 369/112.03; 369/44.23; 369/112.06; 369/112.23

(58) Field of Classification Search
USPC ............. 369/112.01, 112.03, 112.06, 112.08, 369/112.23, 44.23, 44.32, 112.05, 112.11, 369/112.12
See application file for complete search history.

(56) References Cited

U.S. PATENT DOCUMENTS

| 7,227,704 | B2 * | 6/2007 | Koike ........................... 359/719 |
| 7,468,942 | B2 * | 12/2008 | Koike et al. ............... 369/112.07 |
| 7,551,539 | B2 * | 6/2009 | Kimura et al. ............ 369/112.07 |
| 7,778,138 | B2 * | 8/2010 | Kimura ..................... 369/112.03 |
| 2002/0060857 | A1 * | 5/2002 | Hosoe ........................... 359/719 |
| 2003/0227858 | A1 * | 12/2003 | Komma ................... 369/112.08 |
| 2004/0170106 | A1 * | 9/2004 | Komma ..................... 369/112.1 |
| 2006/0062104 | A1 * | 3/2006 | Kimura et al. ............. 369/44.23 |
| 2010/0002562 | A1 * | 1/2010 | Kaneda ..................... 369/112.23 |
| 2010/0284259 | A1 * | 11/2010 | Nakamura ............... 369/112.03 |

FOREIGN PATENT DOCUMENTS

| JP | H09-311271 A | 12/1997 |
| JP | 2003-215447 A | 7/2003 |
| JP | 2004-253106 A | 9/2004 |
| JP | 2005-050433 A | 2/2005 |
| JP | 2008-165971 A | 7/2008 |

* cited by examiner

*Primary Examiner* — Thomas Alunkal
(74) *Attorney, Agent, or Firm* — Judge Patent Associates

(57) ABSTRACT

An optical element which has optical steps each providing a phase difference to transmitted light and has low light amount loss and a high efficiency is provided. The optical element includes a symmetry axis, a plurality of optically functional surfaces which are ring-shaped regions around the symmetry axis, and a plurality of wall regions connecting the optically functional surfaces to each other. The optically functional surfaces and the wall regions constitute the optical steps. On a cross-section taken by, as a cutting plane, a plane including the symmetry axis, the contour line of each wall region is substantially parallel to a light beam which is incident on the optically functional surface on the outer side and passes near the wall region. The maximum value of the angle between the symmetry axis and the light beam passing near the wall region is equal to or more than 25 degrees.

6 Claims, 13 Drawing Sheets

OPTICAL ELEMENT AND OPTICAL PICKUP DEVICE USING THE SAME

CROSS-REFERENCE TO RELATED APPLICATION

This application is a U.S. continuation application filed under 35 USC 111(a) claiming benefit under 35 USC 120 and 365(c) of PCT application JP2010/005688, filed Sep. 17, 2010, which claims priority to Japanese Patent Application No. 2009-216224, filed on Sep. 17, 2009. The foregoing applications are hereby incorporated herein by reference.

BACKGROUND OF THE INVENTION

1. Field of the Invention

The present invention relates to an optical element used for performing at least one of recording, reproducing, and erasing of information on an information recording surface of an optical information storage medium, and an optical pickup device using the same.

2. Description of the Background Art

The NA of an objective lens for use in an optical pickup device for high-recording-density optical disc (e.g., Blu-ray Disc (registered trademark)) is high as compared to those used for CD and DVD, and thus the depth of the focal point is shallow. In addition, when light source power is changed to switch an operation from reproducing to recording in the optical pickup device, the wavelength of the laser beam source instantly changes due to mode hopping. At that time, when an optical system has a chromatic aberration, the spot position shifts and an off-track may occur.

Thus, in a BD optical system, it is necessary to compensate an on-axis chromatic aberration. For the compensation, diffraction is generally used, and various optical elements provided with diffraction structures have been developed. For example, various optical elements in which diffraction structures are provided to a collimating lens, an afocal lens, and an objective lens have been proposed. For example, Japanese Laid-Open Patent Publication No. 9-311271 discloses technology to provide a diffraction structure for chromatic aberration compensation, to a high-NA objective lens.

However, when the configuration disclosed in Japanese Laid-Open Patent Publication No. 9-311271 is used, it is necessary to pay attention to the shape of a sawtooth-like diffraction structure (hereinafter, also referred to as "relief shape") in order to obtain a high diffraction efficiency. In general, when the depth of the relief shape is set to $\lambda/(nd-1) \times m$ ($\lambda$: designed wavelength, nd: material refractive index, m: natural number), the highest diffraction efficiency is obtained. In addition, although strictly different from a diffraction efficiency, a light beam having passed through a relief may be then blocked by an adjacent relief. Even when the blaze depth is set such that a high diffraction efficiency is obtained, if a blocked portion is great, the lens has a poor efficiency as a result.

SUMMARY OF THE INVENTION

It is an object of the present invention to provide an optical element which has optical steps each providing a phase difference to transmitted light and which has low light amount loss and a high efficiency.

The present invention is directed to an optical element having optical steps each providing a phase difference to a transmitted light beam. The optical element includes: a symmetry axis; a plurality of optically functional surfaces which are ring-shaped regions around the symmetry axis; and a plurality of wall regions connecting the optically functional surfaces to each other. The optically functional surfaces and the wall regions constitute the optical steps, each wall region has a taper shape, and a taper angle of an outer surface of each wall region is substantially equal to an angle formed between the symmetry axis and a light beam which is incident on the optically functional surface on the outer side of the each wall region and passes near the each wall region.

According to the present invention, an optical element can be realized which has optical steps each providing a phase difference to transmitted light and which has low light amount loss and a high efficiency.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described in detail with reference to the drawings.

Embodiment 1

Figure 1:
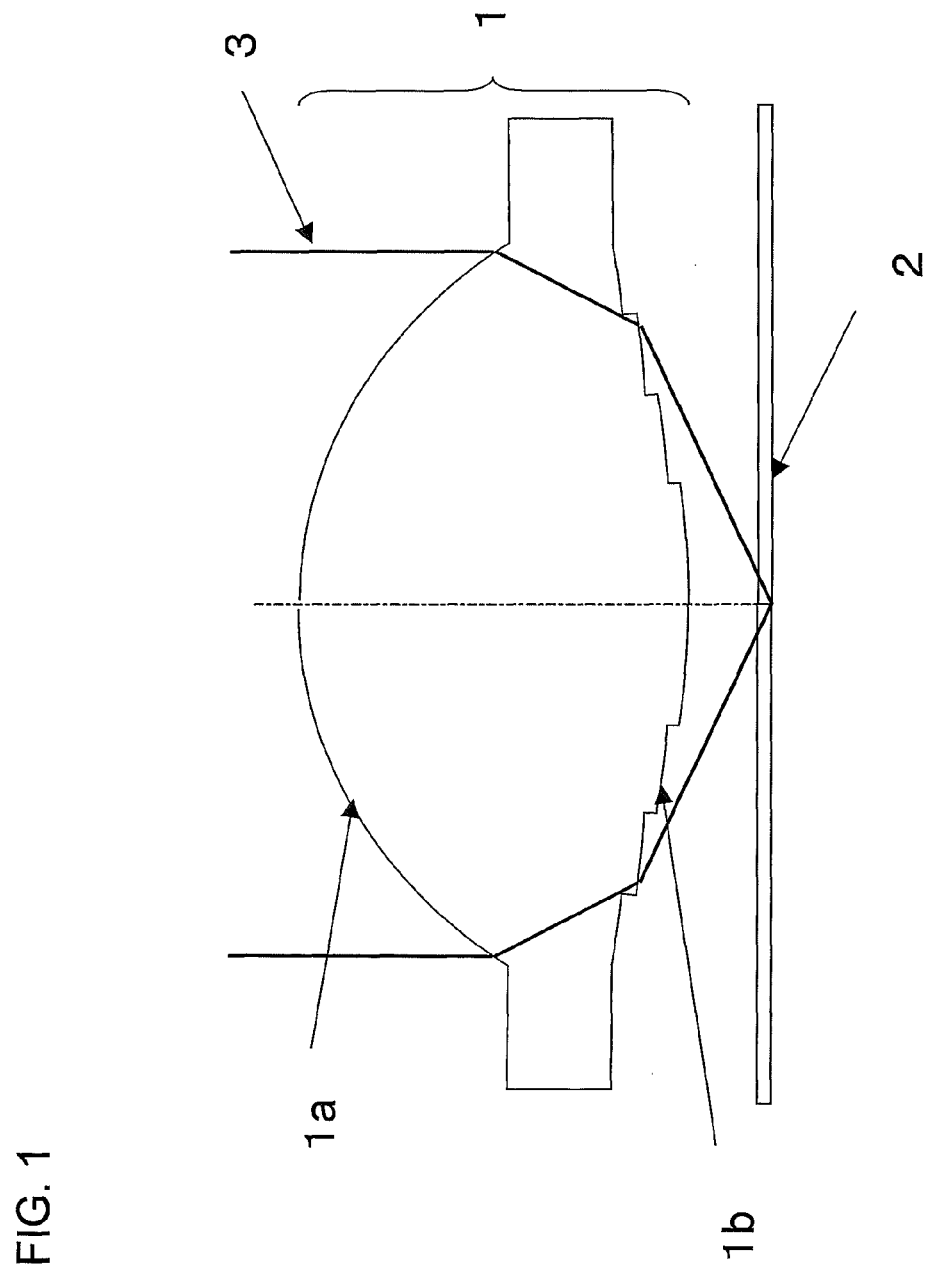
FIG. 1 is a diagram showing a schematic configuration of an objective lens element according to Embodiment 1.

FIG. 1 is a diagram showing a schematic configuration of an objective lens element according to Embodiment 1. The objective lens element 1 according to the present embodiment is used to focus a laser beam on an information recording surface of an information storage medium 2. Here, the type of the information storage medium 2 is not particularly limited to a specific one. The information storage medium 2 may be an optical disc such as CD (Compact Disc), CD-R (Compact Disc Recordable), CD-RW (Compact Disc ReWritable), CD-ROM (Compact Disc Read Only Memory), DVD (Digital Versatile Disc), DVD-R (Digital Versatile Disc Recordable), DVD-RW (Digital Versatile Disc ReWritable), DVD-ROM (Digital Versatile Disc Read Only Memory), DVD-RAM (Digital Versatile Disc Random Access Memory), EVD (Enhanced Versatile Disc), EVD-R (Enhanced Versatile Disc Recordable), EVD-RW (Enhanced Versatile Disc ReWritable), EVD-ROM (Enhanced Versatile Disc Read Only Memory), EVD-RAM (Enhanced Versatile Disc Random Access Memory), BD (Blu-ray Disc), BD-R (Blu-ray Disc Recordable), BD-RW (Blu-ray Disc ReWritable), BD-ROM (Blu-ray Disc Read Only Memory), or BD-RAM (Blu-ray Disc Random Access Memory), all of which are registered trademarks.

A light beam 3 (e.g., a wavelength of 405 nm) emitted from a light source (not shown) is converted by a collimating lens (not shown) into substantially parallel light and is incident on the objective lens element 1. The objective lens element 1 is a single lens element which has optical steps each providing a phase difference to a transmitted light beam. Here, the objective lens element 1 is not limited to the single lens element as long as it is an objective lens system having optical steps. The light beam 3 is incident on an aspheric surface 1a and emitted from an aspheric surface 1b. The emitted light beam 3 is converged on the information recording surface of the optical information storage medium 2 to form a desired spot. The light beam 3 reflected by the information recording surface is incident on the aspheric surface 1b of the objective lens element 1, is emitted from the other aspheric surface 1a, is incident as substantially parallel light on the collimating lens and the like again, and is converted by a detector (not shown) into an electric signal to be detected.

Here, the shape of the objective lens element 1 will be described in detail. The objective lens element 1 has the aspheric surface 1a, which is a first surface, and the aspheric surface 1b which is a second surface. On the aspheric surface 1b, a diffraction structure providing a phase difference to incident light is provided. The diffraction structure is provided for the purpose of reducing an aberration which occurs when the temperature of the objective lens element 1 changes.

Figure 2:
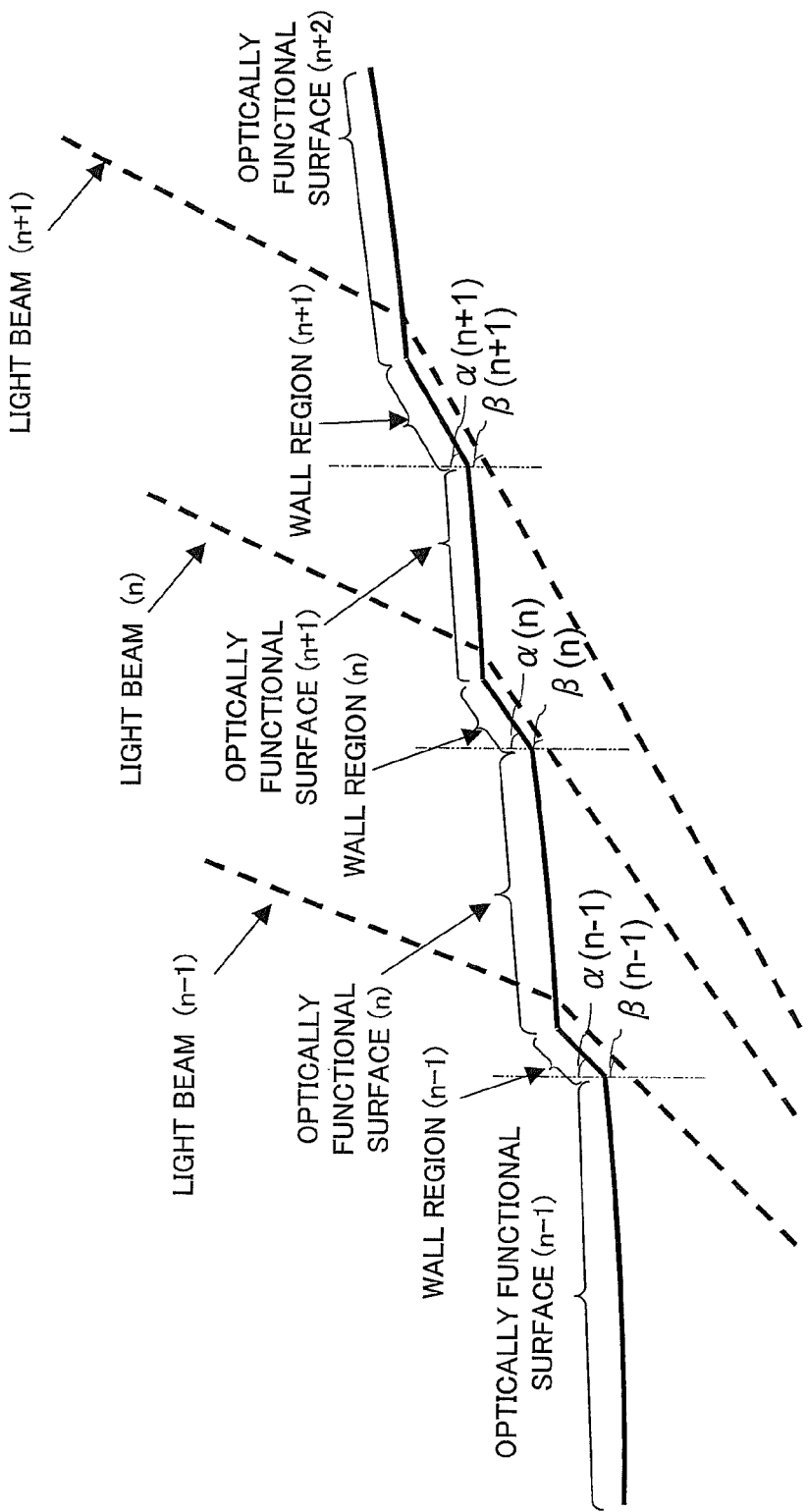
FIG. 2 is a diagram showing optical steps provided on a second surface of the objective lens element and the optical path of a light beam incident thereon.

FIG. 2 is a diagram showing optical steps provided on the second surface of the objective lens element and the optical path of a light beam incident thereon.

On the second surface of the objective lens element 1, optical steps are provided which are composed of: a plurality of optically functional surfaces (n−1), (n), (n+1), (n+2), ..., which are ring-shaped regions having symmetry axes which coincide with the optical axis; and wall regions (n−1), (n), (n+1), ... which connect the optically functional surfaces to each other. The height of each wall region in a direction parallel to the optical axis, namely, the blaze height, is set so as to generate a phase difference which is one time that of a designed wavelength. Thus, the diffraction efficiency becomes the highest when a used wavelength is equal to the designed wavelength. As the distance in the radial direction from the optical axis to the wall region increases, the taper angle of the outer surface of the wall region with respect to the optical axis increases. In addition, on a cross-section taken by a plane (a cutting plane) including the optical axis (FIG. 2), the contour line of the wall region (n−1) connecting the optically functional surface (n−1) to the optically functional surface (n) is substantially parallel to a light beam (n−1) which is incident on the optically functional surface (n) on the outer side of the wall region (n−1) and passes near the wall region (n−1). In other words, the wall region (n−1) is formed in a tapered manner at a taper angle $\alpha(n-1)$, and the taper angle $\alpha(n-1)$ is substantially equal to the angle $\beta(n-1)$ formed between the symmetry axis and the light beam (n−1) which passes near the wall region (n−1) after being incident on the optically functional surface (n) on the outer side of the wall region (n−1). The contour lines of the wall regions (n) and (n+1) shown in FIG. 2 are substantially parallel to light beams passing near the wall regions (n) and (n+1), respectively. The taper angles $\alpha(n)$ and $\alpha(n+1)$ are substantially equal to the angles $\beta(n)$ and $\beta(n+1)$ of the light beams (n) and (n+1) with respect to the optical axis, respectively. In addition, all the wall regions that are not shown in FIG. 2 are similarly configured.

Figure 3:
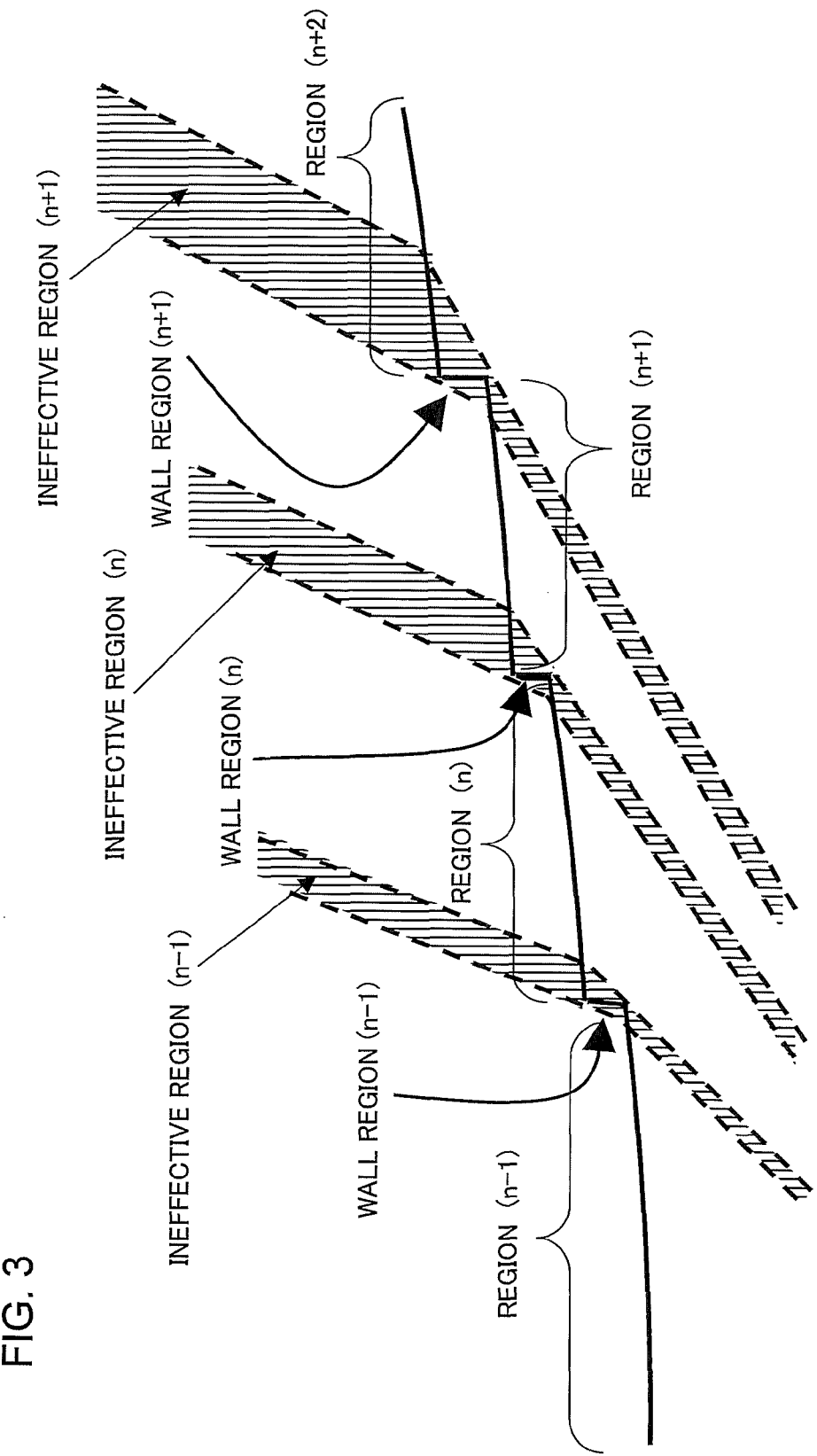
FIG. 3 is a diagram showing a conventional objective lens element having optical steps.

FIG. 3 is a diagram showing a conventional objective lens element having optical steps. Similarly to the example of FIG. 2, the objective lens element of the FIG. 3 has a step structure on the second surface side.

When an emitted light beam is tilted with respect to the optical axis, an amount of the light beam blocked by wall regions increases. Thus, even when the blaze height is adjusted so as to increase the diffraction efficiency, the lens eventually has a poor light efficiency if the amount blocked by the wall regions is large. In the objective lens element of FIG. 3, all the contour lines of the wall regions (n−1), (n), (n+1), ... are designed so as to be parallel to the optical axis. When a light beam tilted with respect to the optical axis passes near the wall region, a portion of the light beam is blocked by the wall region. Ineffective regions (n−1), (n), (n+1), ... which are surrounded by broken lines in FIG. 3 represent regions through which a light beam which is not effectively used due to the above reason passes. The light beam which is not effectively used refers to a light beam which does not contribute to the spot formed by the objective lens element. Thus, a lens having many ineffective regions has a low light use efficiency.

Referring back to FIG. 2, the emission angle of the light beam having passed through the second surface increases from the optical axis toward the outer periphery. When steps are provided so as to correspond to the tilt of the light beam, it is possible to reduce an amount of the light beam blocked by the steps. As a result, a lens having a high light use efficiency can be realized. In addition, in the present invention, designing is performed such that the maximum value of the angle ($\beta$ in FIG. 2) formed between the optical axis (which coincides with the symmetry axis of the optically functional surface) and the light beam passing near the wall region, namely, the angle formed between the optical axis and the light beam passing outside and near the outermost wall region, is equal to or more than 25 degrees. If the maximum value of the angle is less than 25 degrees, when an objective lens element having a nearly equal thickness in the optical axis direction is assumed, the area of the ineffective region is too large and the lens cannot be put into practical use. When the area of the ineffective region is too large, the amount of the light beam passing outside and near the outermost wall region decreases, and it is difficult to ensure an effective numerical aperture. In addition, if the maximum value of the angle is less than 25 degrees, the thickness of the objective lens element has to be increased in order to reduce the area of the ineffective region to ensure an effective numerical aperture. Thus, the lens is thick in the optical axis direction, and a compact objective lens element cannot be realized. It should be noted that since the taper angle ($\alpha$) of the outer surface of the wall region is substantially equal to the angle ($\beta$) formed between the symmetry axis and the light beam passing outside and near the wall region, the maximum value of the taper angle of the outer surface of the wall region, namely, the taper angle of the outermost wall region, is also equal to or more than 25 degrees.

In the present embodiment, the amount of phase change caused by each step corresponds to 1 wavelength of the designed wavelength, but suffices to be an integral multiple of wavelength. Alternatively, when a plurality of wavelengths is used with respect to one lens, the amount of phase change may not be an integral multiple of wavelength. Still alternatively, the objective lens system may be composed of a plurality of lens elements, not a single lens element, as long as it has at least optical steps. In addition, in the present embodiment, the optical steps are provided on the second surface side, but may be provided on the first surface side. However, when the optical steps are provided on the first surface side, the obtained effect is small, since the angle formed between the optical axis and the contour line of the wall region is small. Thus, it is preferred to provide the optical steps on the second surface side. In the present embodiment, the first surface of the objective lens element 1 is an aspheric surface, but is not limited thereto. The first surface may be a diffractive surface or a phase step surface, or may be divided into concentric ring-shaped regions.

Further, in the present embodiment, the objective optical system for BD has been described in detail, but an objective lens element for DVD/CD may be disposed adjacently on the same actuator. In addition, in the present embodiment, the objective lens element dedicated for BD has been illustrated, but may have a compatible function with another optical information storage medium.

Moreover, the above optical steps (i.e., a plurality of optical surfaces and a plurality of wall regions connecting these optical surfaces) may be provided on an element having no power such as a plate, to form an optical element for aberration compensation.

Embodiment 2

Figure 4:
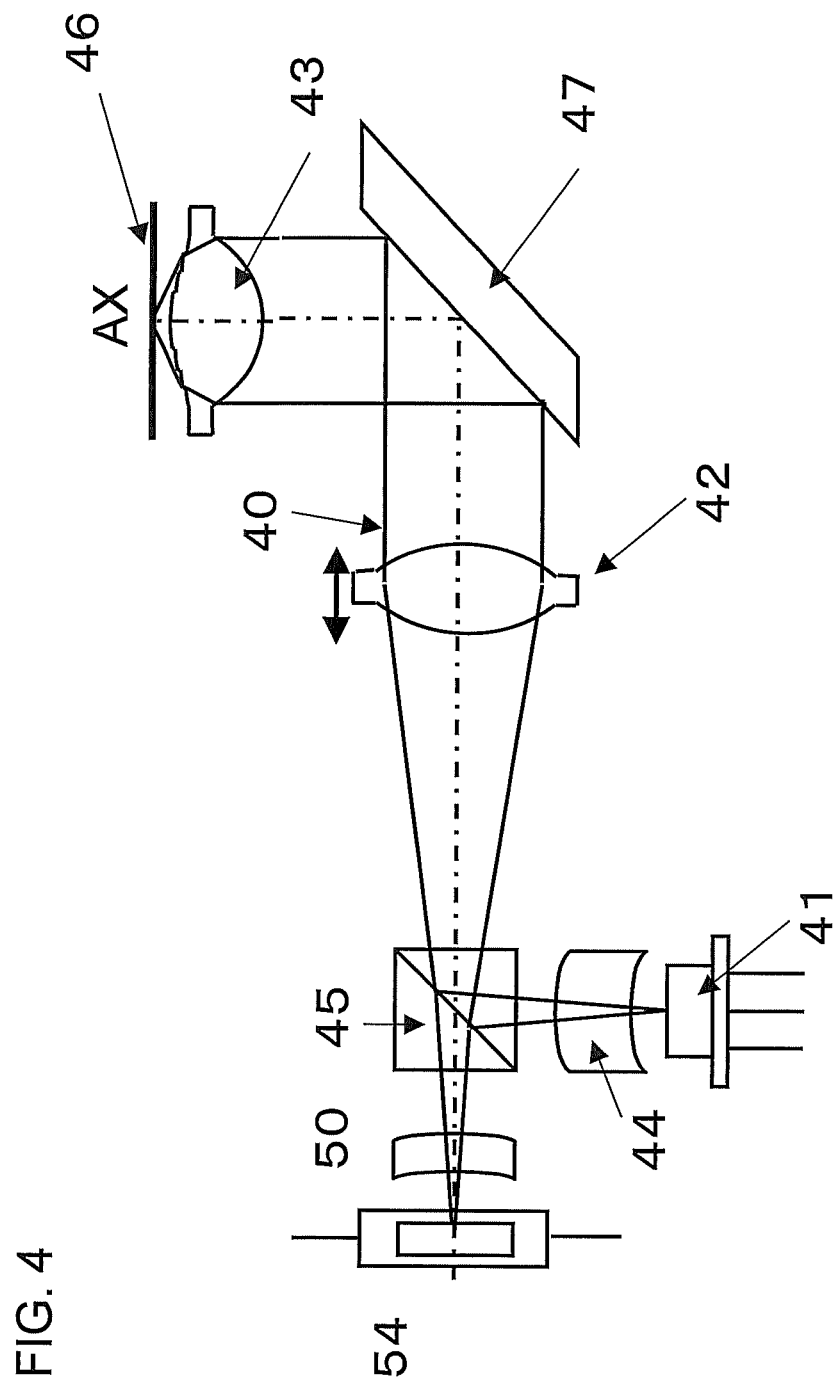
FIG. 4 is a schematic configuration diagram of an optical pickup device according to Embodiment 2.

FIG. 4 is a schematic configuration diagram of an optical pickup device according to Embodiment 2. The optical pickup device according to the present embodiment realizes stable recording and reproducing by using an objective lens element according to the present invention.

The optical pickup device according to Embodiment 2 includes a light source 41, a beam shaping lens 44 which shapes a light beam emitted from the light source 41, a beam splitter 45, a collimating lens 42, an upward reflection mirror 47, an objective lens element 43, a detection lens 50, and a detector 54. The light source 41 emits a laser beam (diverging light) with a wavelength corresponding to the type of an information storage medium 46. For example, when the information storage medium 46 is a BD (registered trademark), a light source 41 which emits a laser beam with a wavelength of 378 to 438 nm (may be less than 420 nm) is used. When the information storage medium 46 is a DVD (registered trademark), a light source 41 which emits a laser beam with a wavelength of 630 to 690 nm is used. When the information storage medium 46 is a CD (registered trademark), a light source 41 which emits a laser beam with a wavelength of 750 to 810 nm is used. When an optical pickup device having compatibility with three types of optical discs, namely, CD, DVD, and BD, is configured, a light source 41 which selectively emits light with a wavelength corresponding to the type of each optical disc can be used.

The beam shaping lens 44 is disposed in front of the light source 41. The laser beam emitted from the light source 41 is shaped by the beam shaping lens 44 into a desired shape. The laser beam shaped by the beam shaping lens 44 is reflected by a reflecting surface of the beam splitter 45 toward the information storage medium 46. Here, the beam shaping lens 44 may be omitted. The collimating lens (may be composed of a single lens element or may be composed of a plurality of lens elements) 42 and the objective lens element 43 for focusing a laser beam on each information recording surface of the information storage medium 46 are disposed between the beam splitter 45 and the information storage medium 46.

The objective lens element 43 is the same as that described in Embodiment 1. The first surface on the incident side is an aspheric surface, and the second surface on the exit side has optical steps. The repeated description of the shape of the second surface is omitted. In the present embodiment, an objective optical system is composed of the single objective lens element 43. However, according to need, the objective optical system may be composed of an objective lens element and another one or more optical elements such as a phase compensation element and a beam expander lens. In this case, an optical element may be formed by providing the above optical steps on an element having no power such as a plate, and the objective optical system may be composed of a combination of this optical element and an objective lens element.

The NA of the objective lens element 43 is not particularly limited to a specific value, but is preferably, for example, equal to or higher than 0.8 particularly when the optical pickup device focuses a laser beam on BD (registered trademark) or the like.

The laser beam focused on the information recording surface of the information storage medium 46 by the objective lens element 43 is reflected by the information recording surface. Then, the light reflected by the information recording surface is incident on the detector 54 via the objective lens element 43, the upward reflection mirror 47, the collimating lens 42, and the beam splitter 45 again, and via the detection lens 50.

In the present embodiment, the collimating lens 42 serves as an aberration compensation element, is located at a reference position between the beam splitter 45 and the objective lens element 43, and is configured so as to be able to shift from the reference position along the optical axis AX. Moreover, in the present embodiment, when the collimating lens 42 which serves as an aberration compensation element is located at the reference position, substantially parallel light is incident on the objective lens element 43.

Here, the example where the collimating lens 42 is used as an aberration compensation element has been described. However, an aberration compensation element may be composed of only a beam expander disposed between the collimating lens and the objective lens, or may be composed of a beam expander and a collimating lens. In addition, a liquid crystal lens, a liquid lens, or the like may be used as an aberration compensation element.

Further, in the present embodiment, the lens elements other than the objective lens element 43, and the other optical elements, may each be formed by only a refractive surface having substantially only a refraction effect, or may each have another optically functional surface such as a diffractive surface or a phase step surface. Moreover, the material of each optical element is not particularly limited to a specific one, and may be, for example, glass or resin.

Further, the optical pickup device may further include, between the light source 41 and the information storage medium 46, an element which substantially does not influence a transmission wavefront aberration. In the embodiment of the present invention, the optical system for BD has been described. However, the optical element according to the present invention is also applicable to an optical pickup device of a so-called dual-lens configuration in which, in order for the pick-up device to be able to perform recording and reproducing on other optical discs such as DVD and CD, another lens (or a compatible lens) is mounted on an actuator on which the objective lens element 43 is mounted.

Embodiment 3

Figure 5:
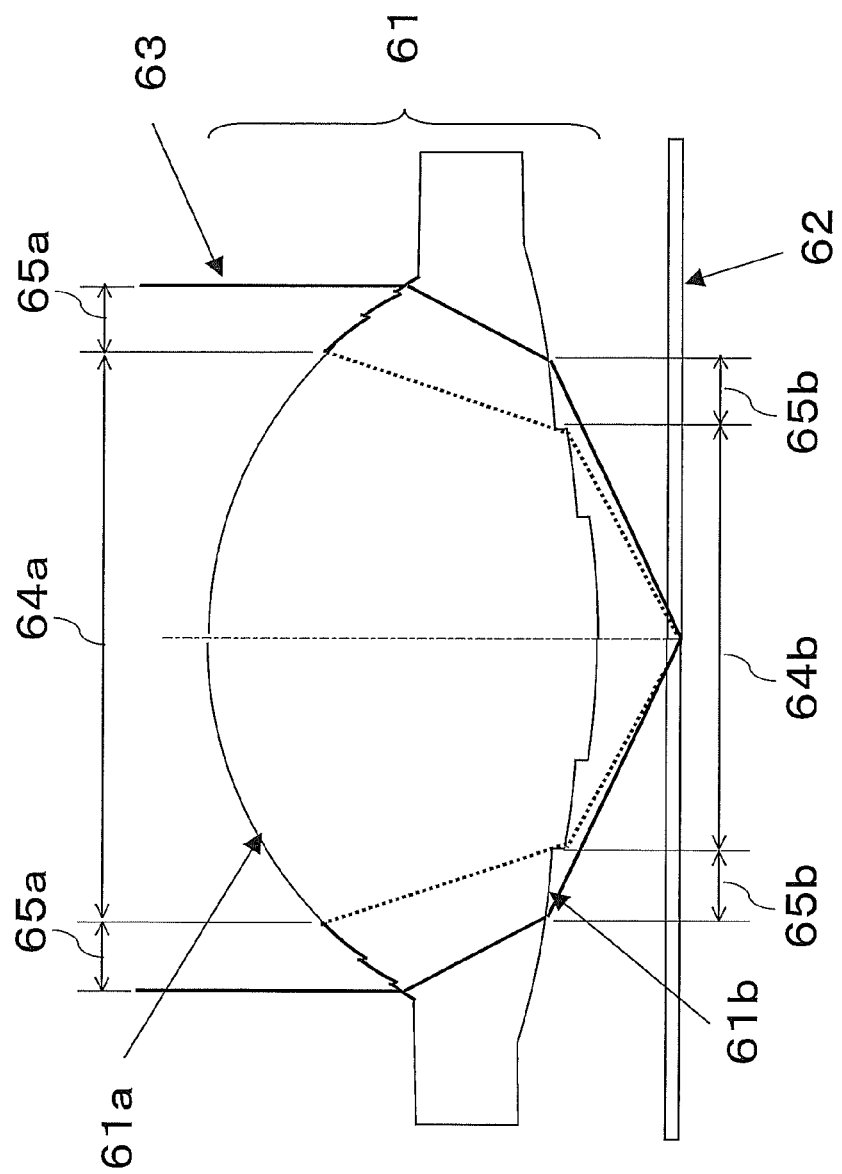
FIG. 5 is a schematic configuration diagram of an objective lens element according to Embodiment 3.

FIG. 5 is a schematic configuration diagram of an objective lens element according to Embodiment 3. The objective lens element 61 according to the present embodiment is used to focus a laser beam on an information recording surface of an information storage medium 62. In the present embodiment, a case will be described where the objective lens element 61 is an objective lens element for BD. However, similarly to Embodiment 1, the objective lens element 61 may be an objective lens element for another optical disc.

Blue light 63 emitted from a light source passes through a beam shaping lens and a collimating lens (both are not shown) and is incident as substantially parallel light on the objective lens element 61. The objective lens element 61 is a single lens element made of resin. A first surface 61a of the objective lens element 61 is divided into an inner region 64a including the optical axis and an outer region 65a surrounding the inner region 64a. The inner region 64a is formed by an aspheric surface, and the outer region 65a is formed by a diffractive surface. A diffraction structure is provided on the outer region 65a in order to compensate an aberration which is caused by refractive index change of the lens material which is caused by temperature change (and wavelength change) when the lens is used.

A second surface 61b of the objective lens element 61 is divided into an inner region 64b including the optical axis and an outer region 65b surrounding the inner region 64b. The inner region 64b is formed by a diffractive surface, and the outer region 65b is formed by an aspheric surface. A diffraction structure is provided on the inner region 64b in order to compensate an aberration which is caused by refractive index change of the lens material which is caused by temperature change (and wavelength change) when the lens is used.

Here, a sign of an amount of phase provided by diffraction at the outer region 65a of the first surface 61a and a sign of an amount of phase provided by diffraction at the inner region 64a of the second surface 61b are opposite. For the purpose of compensating a third-order spherical aberration among aberrations occurring due to refractive index change, the increasing/decreasing directions of phase are different between the inner region 64b and the outer region 65a. In addition, the two diffraction regions do not overlap each other, and thus the same light beam does not pass through the diffraction region twice. In other words, a predetermined NA of the objective lens element is set as a boundary value, a diffraction structure is provided on the inner region 64b of the second surface 61b in a region where the NA is lower than the boundary value, and a diffraction structure is provided on the outer region 65a of the first surface 61a in a region where the NA is higher than the boundary value. Thus, these diffraction structures do not overlap each other.

Further, the diffraction structure provided on the outer region 65a of the first surface 61a has a diffraction shape in which the lens thickness is increased from the optical axis toward the outer periphery. On the other hand, the diffraction structure provided on the inner region 64b of the second surface 61b has a diffraction shape in which the lens thickness is decreased from the optical axis toward the outer periphery.

The combination of the above diffraction shapes and the provided positions is not limited. However, since emission angle is large at the side of the second surface 61b, when a diffraction structure having convex power is provided on the second surface 61b, an ineffective region composed of the wall region portion of the relief (a region where emitted light is blocked) is increased in size to decrease the light use efficiency. Thus, it is preferred to provide a diffraction structure having convex power, on the first surface 61a.

EXAMPLES

Hereinafter, Numerical Examples of the present invention will be specifically described with construction data, aberration diagrams, and the like. It should be noted that in each Numerical Example, a surface to which an aspheric coefficient is provided indicates a refractive optical surface having an aspherical shape or a surface (e.g., a diffractive surface etc.) having a refraction function equal to that of an aspheric surface. The surface shape of an aspheric surface is defined by the following formula 1.

$$X = \frac{C_j h^2}{1 + \sqrt{1 - (1 + k_j)C_j^2 h^2}} + \sum A_{j,n} h^n$$

Here,

X is the distance from an on-the-aspheric-surface point at a height h relative to the optical axis to a tangential plane at the top of the aspheric surface, h is the height relative to the optical axis, $C_j$ is the radius of curvature at the top of an aspheric surface of a lens jth surface ($C_j=1/R_j$), $k_j$ is the conic constant of the lens jth surface, and $A_{j,n}$ is the nth-order aspheric constant of the lens jth surface.

Further, a phase difference caused by a diffraction structure added to an optical surface is provided by the following formula 2.

$$\phi(h) = \Sigma P_{j,m} h^{2m}$$

The meaning of each character in the formula 2 is as follows:

Φ(h) is a phase function, h is the height relative to the optical axis, and $P_{j,m}$ is the 2mth-order phase function coefficient of the lens jth surface.

Numerical Example 1

Tables 1 to 4 show construction data of an objective lens element according to Numerical Example 1.

TABLE 1

| | |
|---|---|
| Wavelength | 0.405 |
| Effective diameter | φ2.04 |
| NA | 0.85 |
| Working distance (WD) | 0.35 |
| Disc thickness (DT) | 0.085 |
| Focal length | 1.20 |

TABLE 2

| Surface No. | Radius of curvature at the top of lens surface | Thickness | Material | Remarks |
|---|---|---|---|---|
| 0 | ∞ | | | |
| 1 | 0.7700732 | 1.491591 | | Aspgerical surface |
| 2 | −3.691007 | WD | n1 | Diffractive surface |
| 3 | ∞ | DT | Disc | Planar |
| 4 | ∞ | | | Planar |

TABLE 3

| | |
|---|---|
| Wavelength | 0.406 |
| n1 | 1.62654 |
| Disc | 1.61736 |

TABLE 4

| First surface | Aspherical surface Aspherical constants |
|---|---|
| RD | 0.7700732 |
| k | −0.573648 |
| A2 | 0 |
| A4 | 0.019099389 |
| A6 | 0.01133628 |
| A8 | 0.017330767 |
| A10 | −0.016358817 |
| A12 | 0.025760707 |
| A14 | 0.01580757 |
| A16 | 0.008685586 |
| A18 | −0.0442692 |

| Second surface | Diffractive surface Aspherical constants |
|---|---|
| RD | −1.098954 |
| k | −21.151279 |
| A2 | 0 |
| A4 | 0.59826972 |
| A6 | −1.2466374 |
| A8 | −0.22539147 |
| A10 | 4.1097225 |
| A12 | −4.0558358 |
| A14 | −1.7805842 |
| A16 | 3.13752 |

| Second surface | Phase function |
|---|---|
| P2 | 100 |

As shown in Table 1, the designed wavelength is 405 nm, the focal length is 1.2 mm, the numerical aperture (NA) is 0.85, and the protective layer thickness of an information storage medium is 0.085 mm. Here, the reason why the designed protective layer thickness is 0.085 mm is to be compatible with a multilayer disc of BD, and this thickness corresponds to a thickness between the thickest protective layer and the thinnest protective layer.

Figure 6:
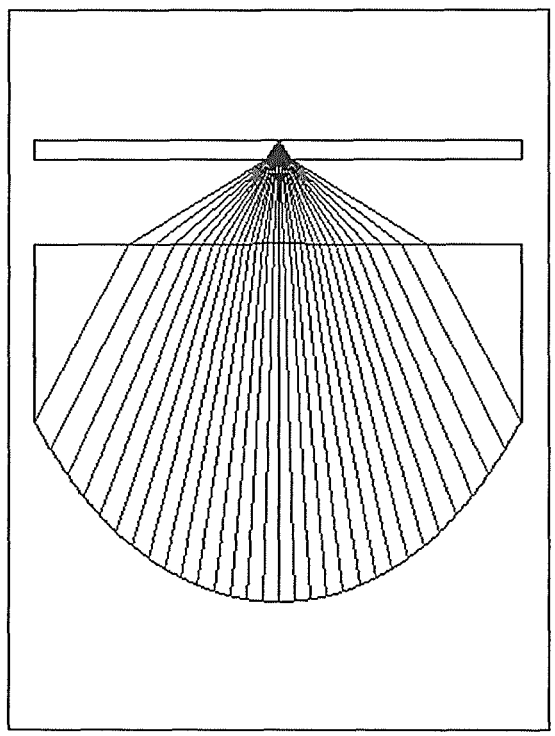
FIG. 6 is an optical path diagram of an objective lens element according to Numerical Example 1.
Figure 7:
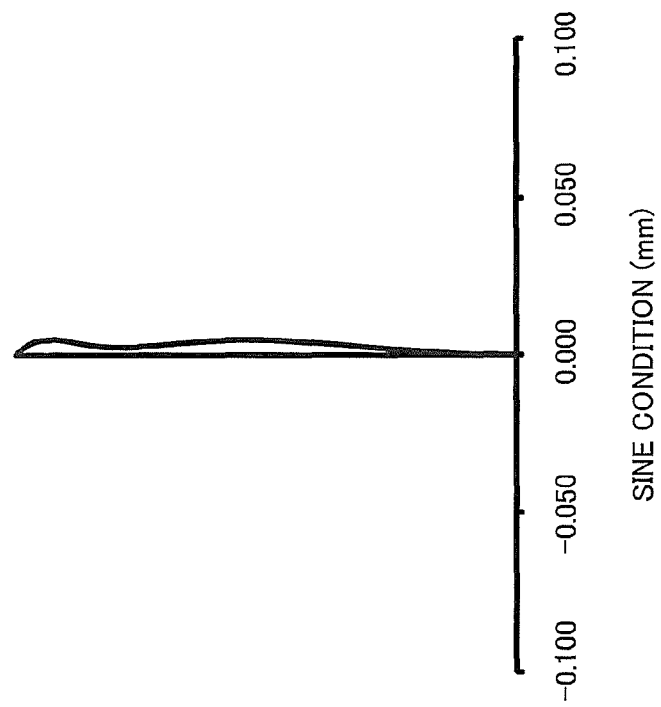
FIG. 7 is a graph showing a spherical aberration when parallel light is incident on the objective lens element according to Numerical Example 1.
Figure 8:
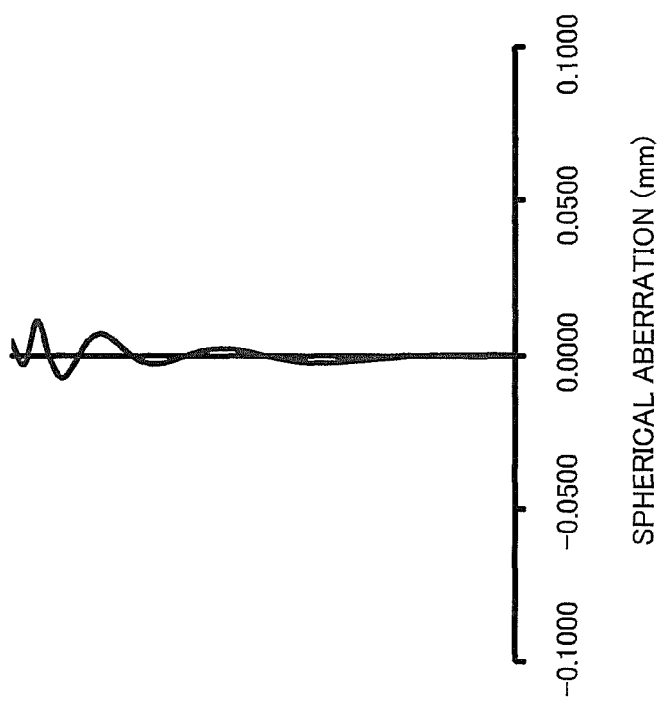
FIG. 8 is a graph showing a sine condition when parallel light is incident on the objective lens element according to Numerical Example 1.

FIG. 6 is an optical path diagram of the objective lens element according to Numerical Example 1. FIG. 7 is a graph showing a spherical aberration when parallel light is incident on the objective lens element according to Numerical Example 1. FIG. 8 is a graph showing a sine condition when parallel light is incident on the objective lens element according to Numerical Example 1.

Figure 9:
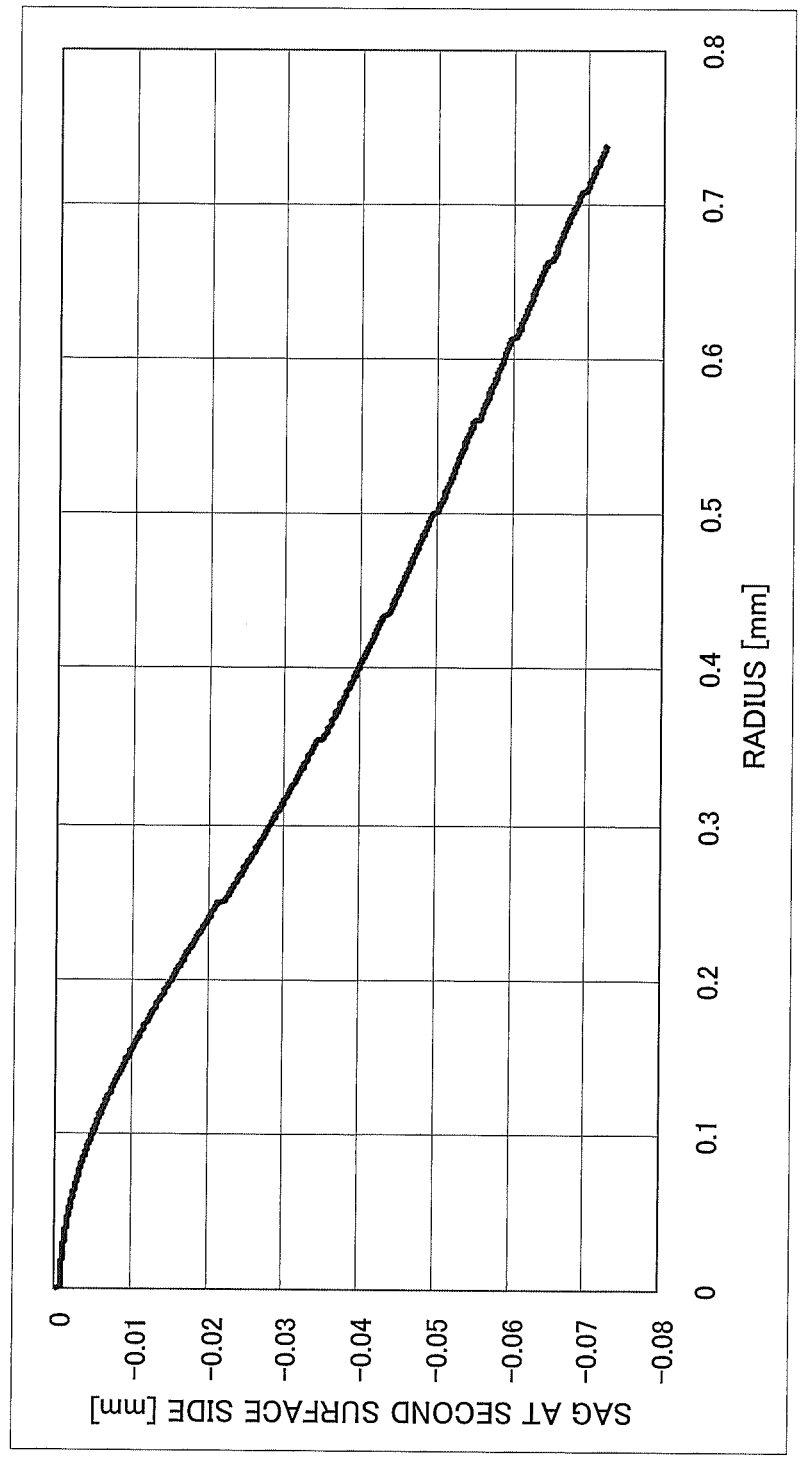
FIG. 9 is a cross-sectional diagram of the diffractive surface shape at the second surface-side of the objective lens element according to Numerical Example 1.

FIG. 9 shows a cross-section of the diffractive surface shape at the second surface side of the objective lens element. The number of aspheric surface regions (ring-shaped optically functional surfaces) provided on the second surface side is 72, and the number of steps (wall regions) provided on the second surface side is 71. The step height (the height of the wall region) along the optical axis direction decreases from the maximum 0.63 μm to the minimum 0.44 μm from the optical axis toward the outer periphery. In addition, the taper angle of the wall region (the angle made with the optical axis) also increases from the minimum 0 degree to the maximum 58 degrees from the optical axis toward the outer periphery.

Numerical Example 2

Tables 5-8 shows construction data of an objective lens element according to Numerical Example 2.

TABLE 5

| | |
|---|---|
| Wavelength | 0.405 |
| Effective diameter | φ1.93 |
| NA | 0.85 |
| Working distance (WD) | 0.30 |
| Disc thickness (DT) | 0.085 |
| Focal length | 1.10 |

TABLE 6

| Surface No. | Radius of curvature at the top of lens surface | Thickness | Material | Remarks |
|---|---|---|---|---|
| 0 | ∞ | | | |
| 1 | 0.8300488 | 1.464589 | | Aspherical surface |
| 2 | −1.2676065 | WD | n1 | Diffractive surface |
| 3 | ∞ | DT | Disc | Planar |
| 4 | ∞ | | | Planar |

TABLE 7

| | |
|---|---|
| Wavelength | 0.405 |
| n1 | 1.62654 |
| Disc | 1.61736 |

TABLE 8

| First surface | Aspherical surface Aspherical constants |
|---|---|
| RD | 0.8300488 |
| k | −0.6056024 |
| A2 | 0 |
| A4 | 0.03351179 |
| A6 | −0.001390222 |
| A8 | −0.012876293 |
| A10 | −0.011688342 |

TABLE 8-continued

| | |
|---|---|
| A12 | −0.005604373 |
| A14 | −0.00232592 |
| A16 | −0.011031504 |
| A18 | −0.041047095 |

| Second surface | Diffractive surface Aspherical constants |
|---|---|
| RD | −1.2676065 |
| k | −51.240101 |
| A2 | 0 |
| A4 | −0.025925773 |
| A6 | −0.1135833 |
| A8 | −0.16634216 |
| A10 | 0.021133238 |
| A12 | 0.21869813 |
| A14 | 1.5906711 |
| A16 | −2.3329219 |

| Second surface | Phase function |
|---|---|
| P2 | 100 |

As shown in Table 5, the designed wavelength is 405 nm, the focal length is 1.10 mm, the numerical aperture (NA) is 0.85, and the protective layer thickness of an information storage medium is 0.085 mm. Here, the reason why the designed protective layer thickness is 0.085 mm is to be compatible with a multilayer disc of BD, and this thickness corresponds to a thickness between the thickest protective layer and the thinnest protective layer.

Figure 10:
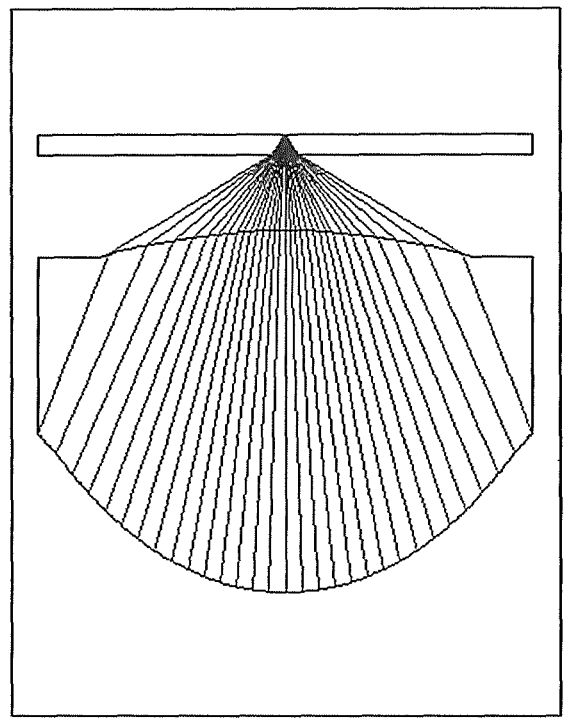
FIG. 10 is an optical path diagram of an objective lens element according to Numerical Example 2.
Figure 12:
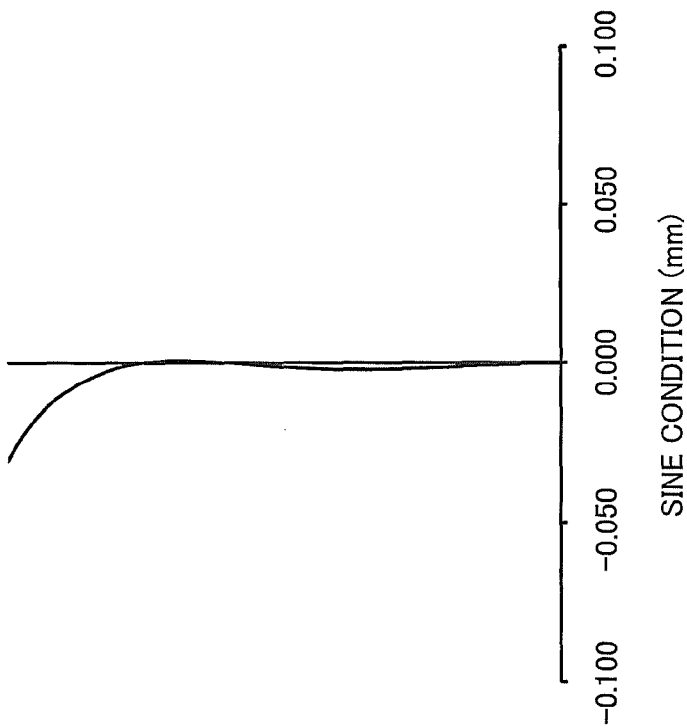
FIG. 12 is a graph showing a sine condition when parallel light is incident on the objective lens element according to Numerical Example 2.
Figure 11:
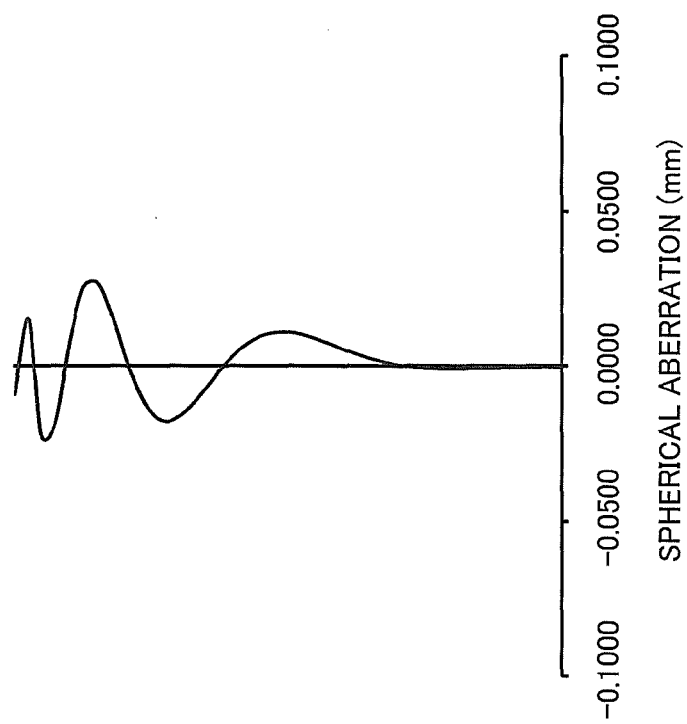
FIG. 11 is a graph showing a spherical aberration when parallel light is incident on the objective lens element according to Numerical Example 2.

FIG. 10 is an optical path diagram of an objective lens element according to Numerical Example 2. FIG. 11 is a graph showing a spherical aberration when parallel light is incident on the objective lens element according to Numerical Example 2. FIG. 12 is a graph showing a sine condition when parallel light is incident on the objective lens element according to Numerical Example 2.

Figure 13:
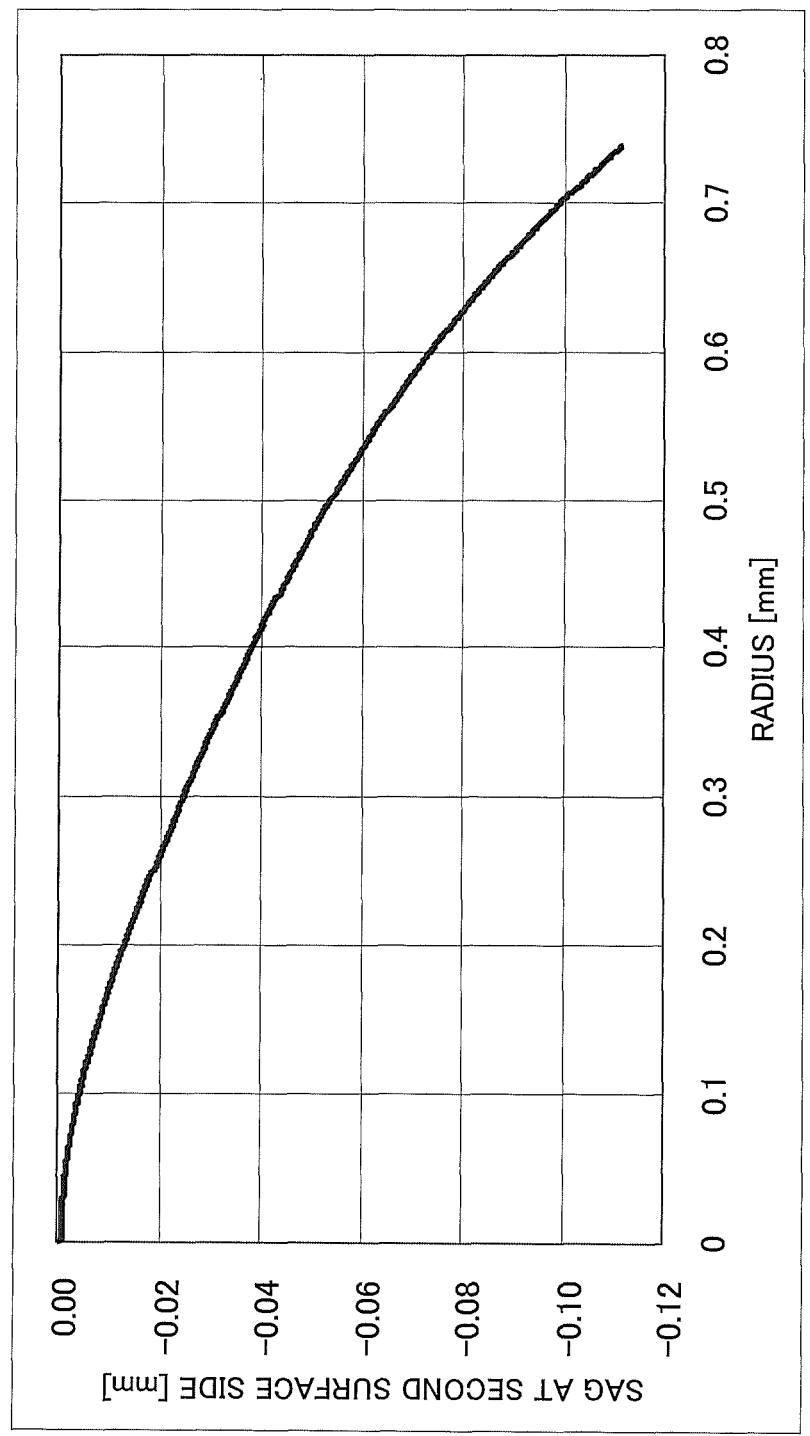
FIG. 13 is a cross-sectional diagram of the diffractive surface shape at the second surface-side of the objective lens element according to Numerical Example 2.

FIG. 13 the cross-section of the diffractive surface shape at the second surface side of the objective lens element. The number of aspheric surface regions (ring-shaped optically functional surfaces) provided on the second surface side is 39, and the number of steps (wall regions) provided on the second surface side is 38. The step height (the height of the wall region) along the optical axis direction decreases from the maximum 0.63 μm to the minimum 0.42 μm from the optical axis toward the outer periphery. In addition, the taper angle of the wall region (the angle made with the optical axis) also increases from the minimum 0 degree to the maximum 58 degrees from the optical axis toward the outer periphery.

Numerical Example 3

Tables 9 to 13 show construction data of an objective lens element according to Numerical Example 3.

TABLE 9

| | |
|---|---|
| Wavelength | 0.408 |
| Effective diameter | φ2.24 |
| NA | 0.86 |
| Working distance (WD) | 0.30 |
| Disc thickness (DT) | 0.0875 |
| Focal length | 1.30 |

TABLE 10

| Surface No. | Radius of curvature at the top of lens surface | Thickness | Material | Remarks |
|---|---|---|---|---|
| 0 | ∞ | | | |
| 1 | 0.8672965 | 1.850065 | | Aspherical surface |
| 2 | −0.8373585 | WD | nl | Diffractive surface |
| 3 | ∞ | DT | Disc | Planar |
| 4 | ∞ | | | Planar |

TABLE 11

| | |
|---|---|
| Wavelength | 0.408 |
| nl | 1.52182743 |
| Disc | 1.61641628 |

TABLE 12

| First surface, first region | Aspherical surface |
|---|---|
| | 0 mm~1.029 mm |
| First region | Aspherical constants |
| RD | 0.86729655 |
| k | −0.78827791 |
| A2 | 0 |
| A4 | 0.060880058 |
| A6 | 0.021539189 |
| A8 | 0.0193428 |
| A10 | 0.058665046 |
| A12 | −0.15693658 |
| A14 | 0.19134798 |
| A16 | −0.087806308 |
| First surface, second region | Diffractive surface |
| Second region | 1.029 mm~1.118 mm |
| | Aspherical constants |
| RD | 0.8619374 |
| k | −0.80111276 |
| A0 | 0.023536993 |
| A2 | 0 |
| A4 | 0.05829429 |
| A6 | 0.016197236 |
| A8 | 0.017141582 |
| A10 | 0.053915775 |
| A12 | −0.16338059 |
| A14 | 0.18817944 |
| A16 | −0.083121622 |
| First surface, second region | Phase function |
| P2 | 151.63443 |
| P4 | 3.02476 |
| P6 | −14.226567 |
| P8 | −52.828147 |
| P10 | −61.509559 |

TABLE 13

| Second surface, first region | Diffractive surface |
|---|---|
| First region | 0 mm~0.484 mm |
| Aspherical constants | |
| RD | −0.83735942 |
| k | −18.506409 |
| A2 | 0 |
| A4 | 0.8995332 |
| A6 | −4.285879 |
| A8 | 3.4786225 |
| A10 | 12.159956 |
| A12 | 17.128127 |
| A14 | −4.2908614 |
| A16 | −255.85641 |
| Second surface, first region | Phase function |
| P2 | 0 |
| P4 | 3508.9622 |
| P6 | −784.8271 |
| P8 | −23377.125 |
| P10 | −2.4374957 |
| Second surface, second region | Aspherical surface |
| Second region | 0.484 mm~0.74 mm |
| Aspherical constants | |
| RD | −0.99131995 |
| k | −15.955191 |
| A0 | −0.009535549 |
| A2 | 0 |
| A4 | 0.92590282 |
| A6 | −3.2445467 |
| A8 | 3.78186 |
| A10 | 4.2908742 |
| A12 | −19.101204 |
| A14 | 22.421183 |
| A16 | −9.3039082 |

As shown in Table 9, the designed wavelength is 408 nm, the focal length is 1.30 mm, the numerical aperture (NA) is 0.86, and the protective layer thickness of an information storage medium is 0.0875 mm. Here, the reason why the designed protective layer thickness is 0.0875 mm is to be compatible with a multilayer disc of BD, and this thickness corresponds to a thickness between the thickest protective layer and the thinnest protective layer.

Figure 14:
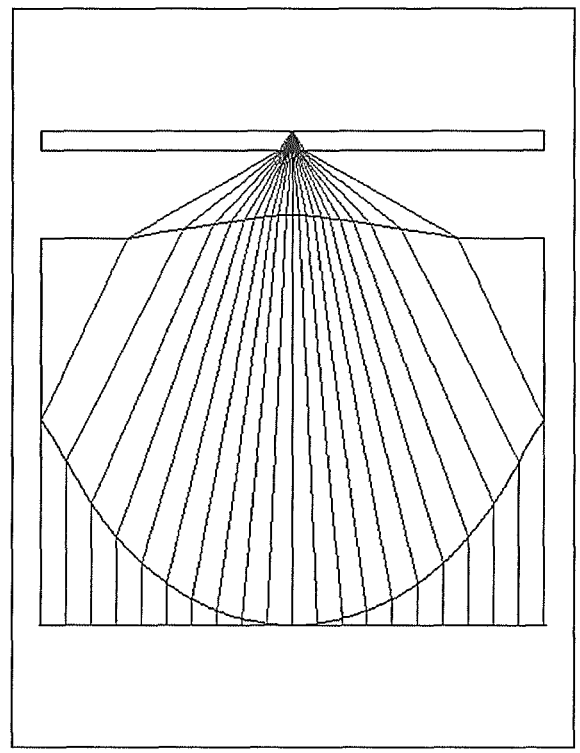
FIG. 14 is an optical path diagram of an objective lens element according to Numerical Example 3.
Figure 16:
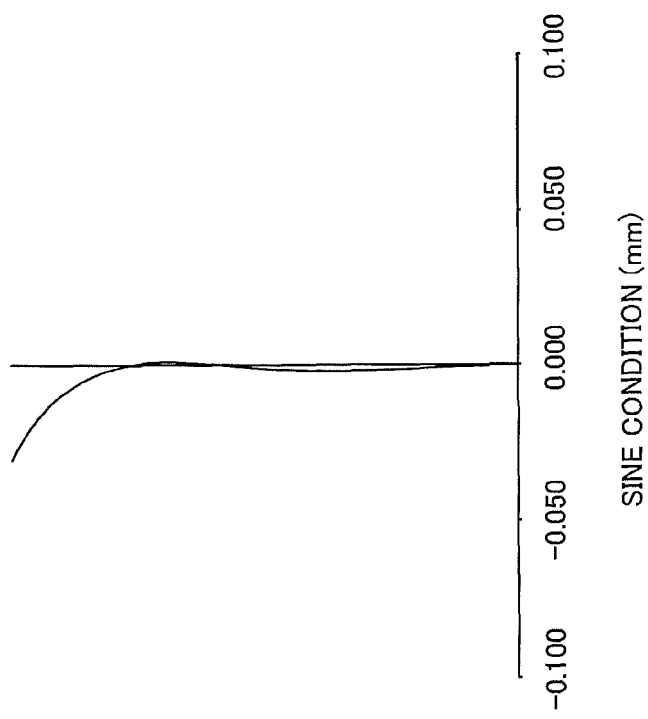
FIG. 16 is a graph showing a sine condition when parallel light is incident on the objective lens element according to Numerical Example 3.
Figure 15:
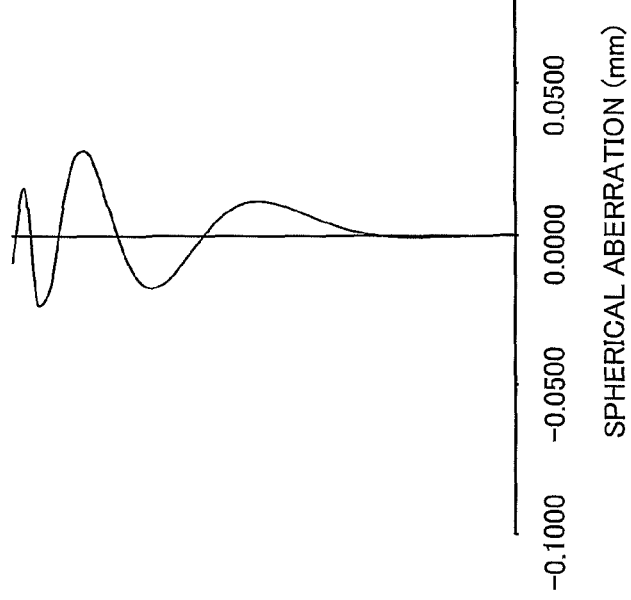
FIG. 15 is a graph showing a spherical aberration when parallel light is incident on the objective lens element according to Numerical Example 3.

FIG. 14 is an optical path diagram of the objective lens element according to Numerical Example 3. FIG. 15 is a graph showing a spherical aberration when parallel light is incident on the objective lens element according to Numerical Example 3. FIG. 16 is a graph showing a sine condition when parallel light is incident on the objective lens element according to Numerical Example 3.

The inner region (first region) of a first surface is formed by an aspheric surface, and the outer region (second region) of the first surface is formed by a diffractive surface. The number of ring zones constituting the diffractive surface is 22. The width of the ring zone in the radial direction decreases from the inner side toward the outer side and is about 5 μm to 3 μm. The blaze depth of the step is a dimension corresponding to a phase difference of 1 wavelength of the wavelength for BD.

The inner region (first region) of a second surface is formed by a diffractive surface, and the outer region (second region) of the second surface is formed by an aspheric surface. The number of ring zones constituting the diffractive surface is 17. The width of the ring zone in the radial direction decreases from the inner side toward the outer side and is about 200 μm to 11 μm. The blaze depth of the step is a dimension corresponding to a phase difference of 1 wavelength of the designed wavelength.

Further, the step height (the height of the wall region) along the optical axis direction decreases from the maximum 0.69 μm to the minimum 0.56 μm from the optical axis toward the outer periphery. In addition, the taper angle of the wall region (the angle made with the optical axis) also increases from the minimum 0 degree to the maximum 25 degrees from the optical axis toward the outer periphery.

The optical element according to the present invention is realized as a lens having a high light use efficiency by modifying the shape of the step structure, and thus can be used for an optical pickup device which performs recording and reproducing on various information storage media such as CD (Compact Disc), DVD (Digital Versatile Disc), BD (Blu-ray Disc), EVD (Enhanced Versatile Disc), and HD-DVD (High Definition Digital Versatile Disc), and an information apparatus (a computer, etc.), a video apparatus, an audio apparatus, and the like, which employ the optical pickup device.

While the invention has been described in detail, the foregoing description is in all aspects illustrative and not restrictive. It will be understood that numerous other modifications and variations can be devised without departing from the scope of the invention.

What is claimed is:

1. An optical element having optical steps each providing a phase difference to a transmitted light beam, the optical element comprising:
   a symmetry axis;
   a plurality of optically functional surfaces which are ring-shaped regions around the symmetry axis; and
   a plurality of wall regions connecting the optically functional surfaces to each other, wherein
   the optically functional surfaces and the wall regions constitute the optical steps, and are provided on an exit side of the optical element with respect to incident light,
   each wall region has a taper shape, and
   a taper angle of an outer surface of each wall region is substantially equal to an angle formed between the symmetry axis and a light beam which is incident on the optically functional surface on the outer side of the each wall region and passes near the each wall region.

2. The optical element according to claim 1, wherein a phase difference provided by each optically functional surface to the transmitted light beam is an integral multiple of the wavelength of the transmitted light beam.

3. The optical element according to claim 1, wherein each optically functional surface diffracts the transmitted light beam.

4. The optical element according to claim 1, wherein the taper angle of the outer surface of the wall region with respect to the symmetry axis increases as a distance from the symmetry axis to the wall region increases.

5. The optical element according to claim 1, wherein a height of the wall region in a direction parallel to the symmetry axis decreases as a distance from the symmetry axis to the wall region increases.

6. An optical pickup device comprising:
   a light source;
   an objective lens element converging light emitted from the light source to form a spot on an information recording surface of an optical information storage medium;
   an aberration compensation element disposed between the light source and the objective lens element, for compensating an aberration by moving along a direction parallel to an optical path of the light emitted from the light source; and a detector detecting light reflected by the information recording surface, wherein the objective lens element comprises a symmetry axis, a plurality of optically functional surfaces which are ring-shaped regions around the symmetry axis, and a plurality of wall regions connecting the optically functional surfaces to each other, and the optically functional surfaces and the wall regions constitute optical steps and are provided on an exit side of the objective lens element with respect to incident light, each wall region has a taper shape, and a taper angle of an outer surface of each wall region is substantially equal to an angle formed between the symmetry axis and a light beam which is incident on the optically functional surface on the outer side of the each wall region and passes near the each wall region.

* * * * *